(12) United States Patent
Johnson

(10) Patent No.: US 7,152,812 B1
(45) Date of Patent: Dec. 26, 2006

(54) FRONT MOUNTED ZERO TURN RADIUS WALK BEHIND SPRAYER

(76) Inventor: William D. Johnson, 4547 NC 581 Hwy., Sims, NC (US) 27880

( * ) Notice: Subject to any disclaimer, the term of this patent is extended or adjusted under 35 U.S.C. 154(b) by 0 days.

(21) Appl. No.: 10/783,850

(22) Filed: Feb. 20, 2004

(51) Int. Cl.
*B05B 1/20* (2006.01)

(52) U.S. Cl. .................. 239/164; 239/159; 239/163; 239/166; 239/169; 239/172; 239/288; 239/551

(58) Field of Classification Search ............. 239/172, 239/159, 161, 163, 164, 166, 167, 169, 175, 239/288, 551, DIG. 15, 518, 521
See application file for complete search history.

(56) References Cited

U.S. PATENT DOCUMENTS

| | | | |
|---|---|---|---|
| 5,190,218 A * | 3/1993 | Kayser et al. | 239/172 |
| 5,215,255 A * | 6/1993 | Kubacak et al. | 239/164 |
| 5,533,676 A * | 7/1996 | Conley | 239/663 |
| 5,662,267 A * | 9/1997 | Hulls | 239/8 |
| 5,765,754 A * | 6/1998 | Emilsson | 239/120 |
| 6,422,483 B1 * | 7/2002 | Yocom et al. | 239/159 |
| 6,502,771 B1 * | 1/2003 | Wyne | 239/663 |
| 2004/0084552 A1 * | 5/2004 | Huartson | 239/146 |

* cited by examiner

*Primary Examiner*—Steven J. Ganey
(74) *Attorney, Agent, or Firm*—Mills Law Firm PLLC

(57) ABSTRACT

The present invention comprises a walk behind zero turn radius drive unit and a front spray frame carrying a plurality of transversely spaced, clearly observable spray nozzles. The drive unit permits accurate and high productivity traverse of the application area with the ability to steer around obstacles and accurately traverse an irregular edging pattern. The spray frame includes a pair of folding spray arms, each of which carried dispensing nozzles. Another set of nozzles is positioned at the sides of the frame. All the nozzles are within the forward lateral view of the operator permitting ready steering of the drive unit around the borders of the application area. The nozzles are supplied with liquid from a frame mounted tank by an electric pump powered by the drive unit. The spray nozzles are controlled by an operator valve positioned adjacent the drive unit control, thereby allowing operator to control the application during travel. For narrower application paths the boom arms may be raised and the boom nozzles inactivated by the control valve. The sprayer is also provided with an edging curtain that is removably mounted at the sides of the frame. The curtain provides a lateral spray barrier and drip edge that, in combination the ZTR drive, provides close delineation between adjacent areas to prevent unwanted treatment of a border area.

13 Claims, 5 Drawing Sheets

FRONT MOUNTED ZERO TURN RADIUS WALK BEHIND SPRAYER

FIELD OF THE INVENTION

The present invention relates to motorized apparatus for spraying liquid additives and, in particular, to a front mounted spray assembly on a walk behind zero turn radius chassis that provides rapid and accurate spray patterns of liquid additives.

BACKGROUND OF THE INVENTION

Many motorized approaches have been taken for applying additives such as nutrients and chemical modifiers, to soil for promoting growth and controlling foliage control to lawns and turf. One of the difficulties has been accurately applying such additives at high depositions rates in areas requiring clear delineation of growth. For instance, shrubbery and trees preferably have desired borders between the lawn and the surrounding mulch. If the fertilized is applied in the mulched areas, unwanted turf invasion is promoted. Similarly, in recreational areas, such as golf courses, different grasses are used for greens, fairways, approaches, and roughs. Each requires a different treatment package and application time. Application beyond the intended boundary can promote invasion of an unwanted species and a loss of the desired pattern.

While hand held spraying devices may be relatively accurately controlled, the application rate is low and labor costs are high, limiting the attractiveness in larger areas. Accordingly motorized spraying units are available for spraying larger areas, but have not overcome the problems of accurately defining the spray pattern at borders of contrasting landscape.

In one prior approach as described in U.S. Pat. No. 4,821,959 to Browning, a reservoir is mounted above and behind the operator on a riding lawn mower. An auxiliary engine operated hydraulic pump is used to disperse the additives through rearwardly disposed conduits and nozzles. With this rearward orientation of application, the operator cannot directly see the dispensing pattern and control the application of the additives to the area traversed by the mower, and must, instead, rely on the vehicle path as an approximation of the spraying pattern. A similar rear mounted spray applicator is disclosed in U.S. Pat. No. 5,553,676 to Conley.

U.S. Pat. No. 3,995,569 to Picardat discloses a riding lawn treating machine wherein liquid spray nozzles are disposed below and behind the operator. As with the above approaches, the operator is not able to see directly the spray pattern to avoid application in adjacent areas requiring different treatment protocols.

Walk behind dispensers have been proposed wherein dry granular or liquid treatment chemicals are applied within the confines of a housing located in front of the operator. U.S. Pat. No. 3,042,308 to Vicendese discloses a dispenser for feeding granular particles to a specially adapted blade of a rotary mower. U.S. Pat. No. 4,352,463 to Baker discloses a liquid treatment dispenser for spraying with a single nozzles from within a covered housing. Both applicators are manually propelled with accordingly low application rates. Also the surrounding housings preclude direct observation of the application pattern and are limited in the ability to accurately maneuver around defined areas and obstacles.

The present invention overcomes the above limitations by providing a sprayer with high maneuverability and high visibility for the purposes of edging and trimming around trees, landscaped and shrubbery areas, and areas of differing ground foliage.

BRIEF SUMMARY OF THE INVENTION

The present invention comprises a walk behind zero turn radius (ZTR) drive unit and a front spray frame carrying a plurality of transversely spaced, clearly observable spray nozzles. The drive unit permits accurate and high productivity traverse of the application area with the ability to steer around obstacles and accurately traverse an irregular edging pattern. The spray frame includes a pair of folding spray arms having a first sect of dispensing nozzles. Another set of nozzles is positioned at the outer sides of the frame. All the nozzles are within the forward lateral view of the operator permitting ready steering of the drive unit around the borders of the application area. The nozzles are supplied with liquid from a frame mounted tank by an electric pump powered by the drive unit. The spray nozzles are controlled by an operator valve positioned adjacent the drive unit control, thereby allowing the operator to control the application during travel. For narrower application paths the boom arms may be raised and the boom nozzles inactivated by the control valve. The sprayer is also provided with an edging curtain that is removably mounted at the sides of the frame. The curtain provides a lateral spray barrier and drip edge that, in combination the ZTR drive, provides close delineation between adjacent areas to prevent unwanted treatment of a border area.

Accordingly, it is an object of the present invention to provide a motorized lawn treatment sprayer that is highly maneuverable in establishing a desired liquid spray pattern.

Another object of the invention is to provide a walk behind lawn treatment sprayer wherein the sprayer nozzles are operative in the front of the operator for clear visibility in establishing a delineated spray pattern with an adjacent area.

A further object is to provide a liquid treatment sprayer using a walk behind zero radius turn drive unit to provide high maneuverability and front mounted transverse spray nozzles that can be directly operator observed for accuracy in application.

A further object is to provide a liquid lawn treatment sprayer having a lateral drip barrier that prevents unwanted application to on adjacent areas.

DESCRIPTION OF THE DRAWINGS

The above and other features and advantages of the invention will become apparent upon reading the following detailed description taken in conjunction with the accompanying drawings in which.

DETAILED DESCRIPTION OF THE PREFERRED EMBODIMENT

Figure 1:
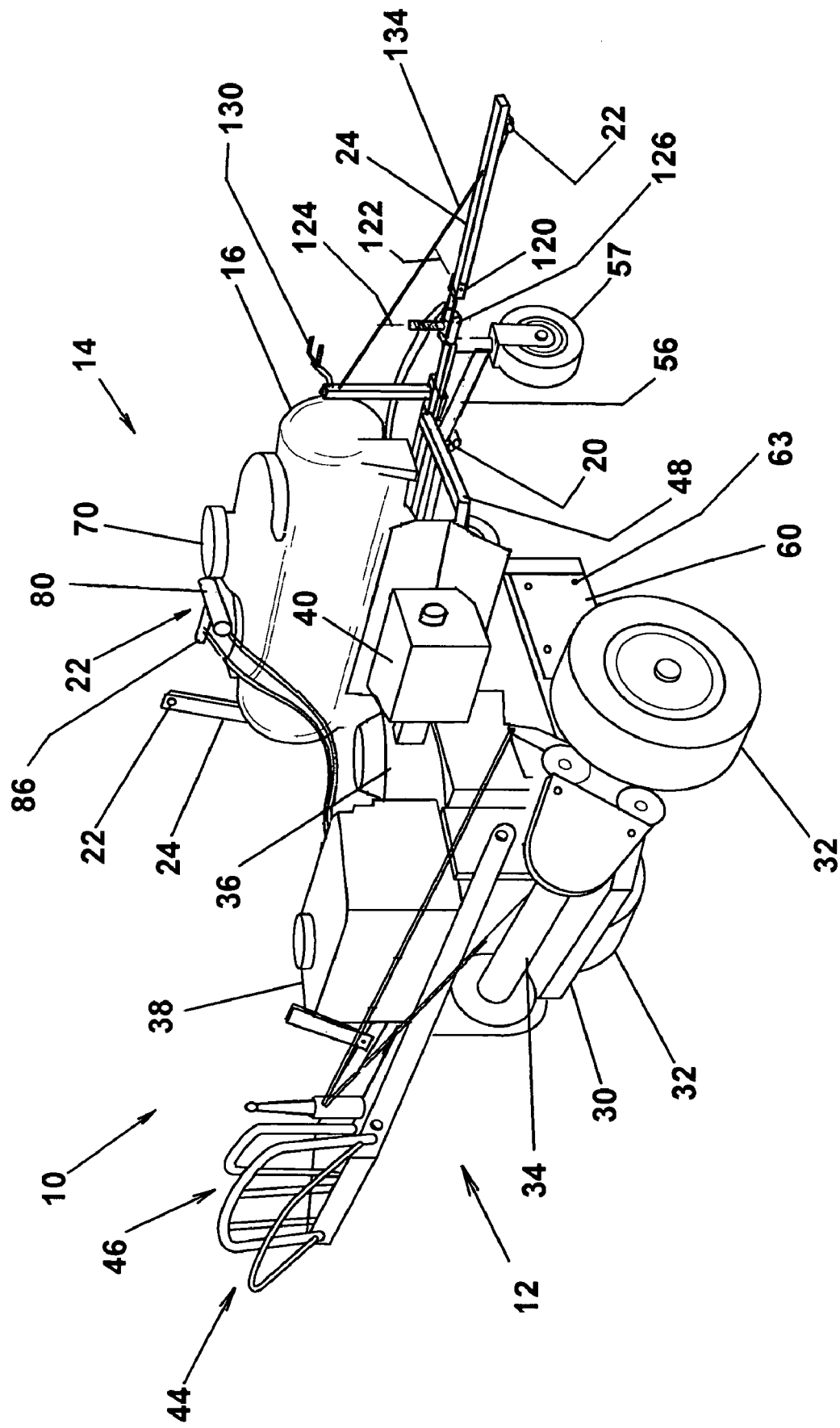
FIG. 1 is a side perspective view of the front mounted zero turn radius walk behind sprayer in accordance with an embodiment of the invention.
Figure 2:
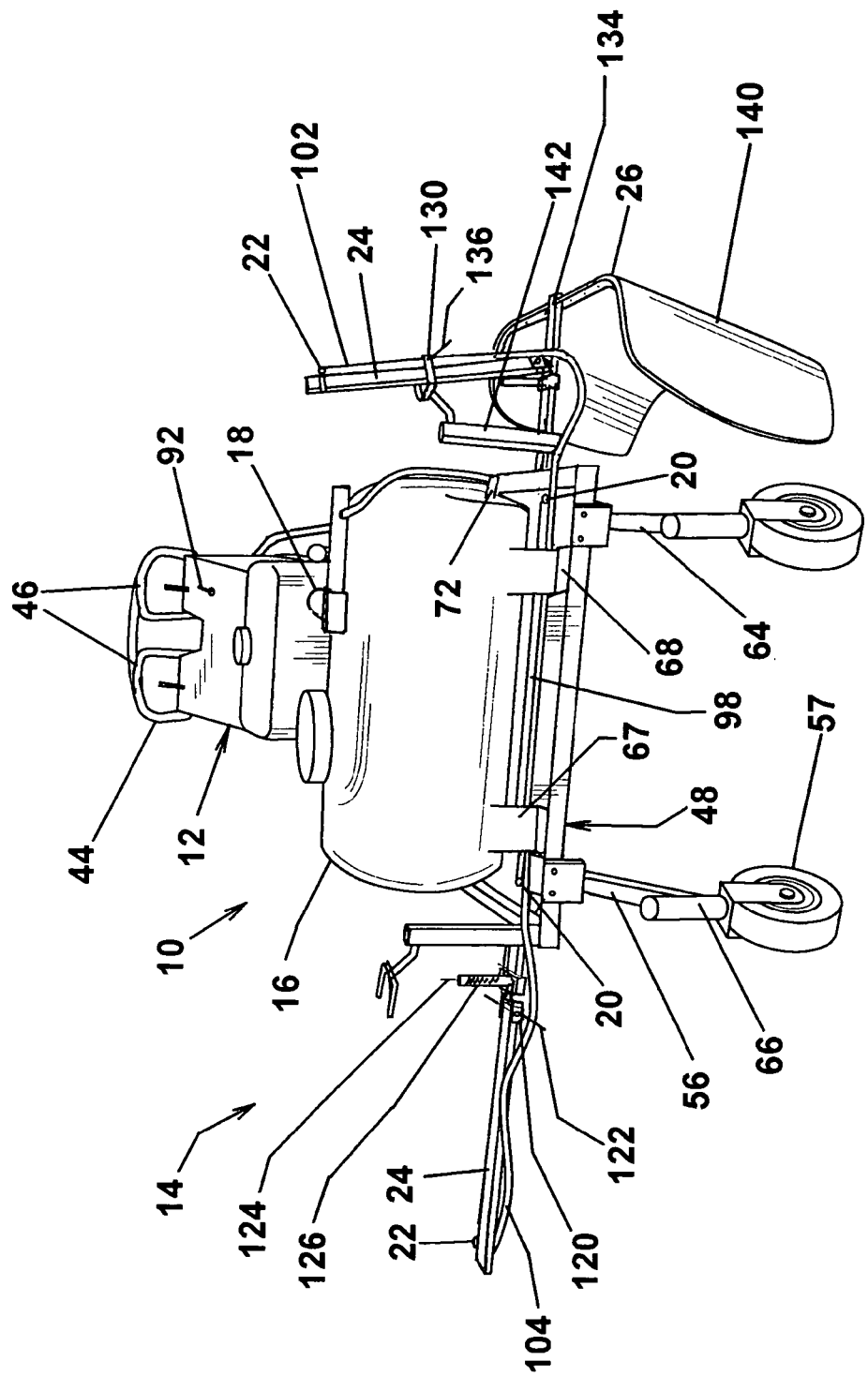
FIG. 2 is a front perspective view of the sprayer of FIG. 1.
Figure 3:
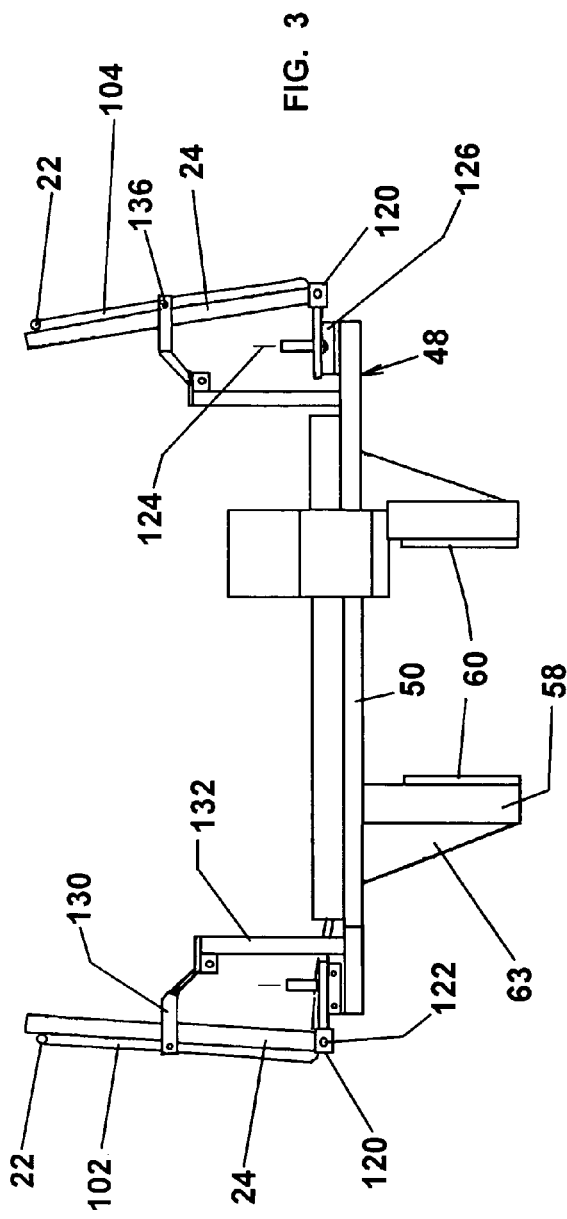
FIG. 3 is a rear view of the frame of FIG. 4 with the sprayer arms in the raised positions.

Referring to the drawings, FIGS. 1 and 3 illustrate a front mounted zero turn radius (ZTR) walk behind sprayer 10 comprising a drive unit 12 and a sprayer assembly 14 coupled thereto. The sprayer assembly 14 includes a tank 16 for carrying turf treatment liquids, such as fertilizers and pesticides. The liquids are delivered from the tank 16 by liquid dispensing system 18 to distribution lines including a first set nozzles 20 on the sprayer assembly and second set of nozzles 22 mounted on transverse folding sprayer arms 24. The nozzles 20,22 spray liquids downwardly and rearwardly. As shown in FIG. 2, with one of the folding arms 24 in the raised position, the sprayer assembly 14 may include a releasably attached edging curtain assembly 26 for accurate delineation of spray patterns around non-turf areas such as trees or shrubbery, or between different grass species.

The drive unit 12 is a suitable commercially available zero turn radius gasoline powered assembly of the type used for lawn equipment, such as mowers, with the lawn mower deck and front wheels removed. A suitable drive unit is available from Snapper, Inc. of McDonough Ga. The drive unit 12 includes a chassis 30 supported on laterally spaced rear drive wheels 32, which are drivingly connected through a hydrostatic drive transmission 34 to an internal combustion engine 36. The engine 36 is coupled to a fuel tank 38, an exhaust muffler 40, an alternator, and an electrical starting system for operation in a well known manner. A control handle assembly 44 is connected to the rear end of the chassis 30 and extends rearwardly and upwardly thereof. The handle assembly 44 is provided with a plurality of control levers 46 for controlling the drive direction, engine speed, wheel speed, and wheel turning, enabling the operator to control the operation of the sprayer direction in a walk-behind mode. The ZTR transmission allows the sprayer to drive in a straight path, turn about a vertical axis centrally intermediate the wheels, a zero turn radius, or turn radii therebetween.

Figure 4:
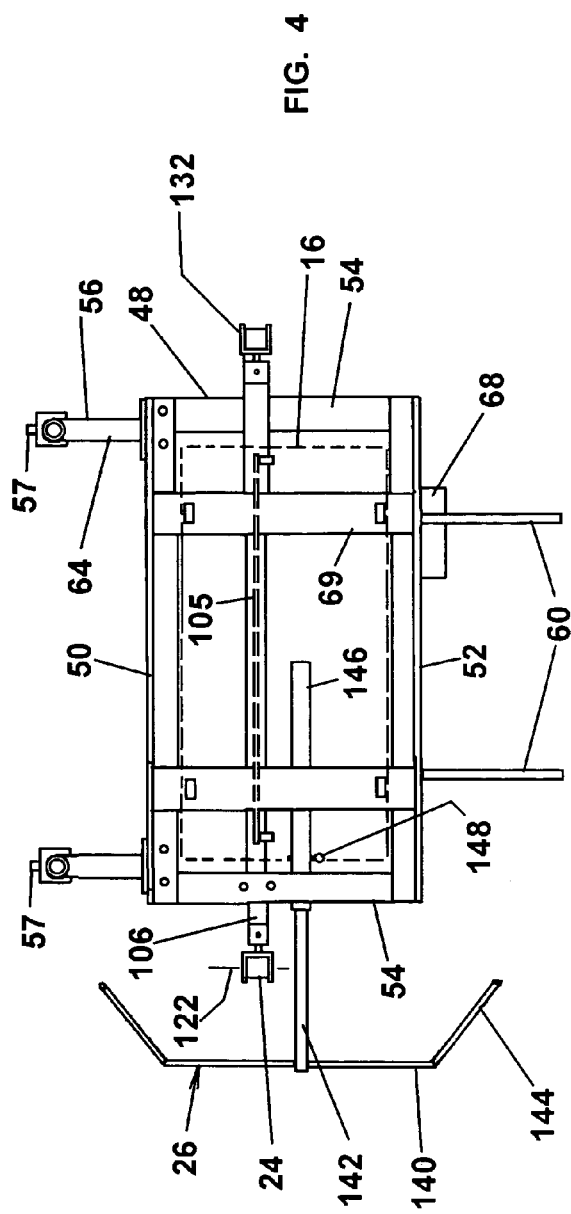
FIG. 4 is a top view of the sprayer frame with the liquid tank assembly removed and an auxiliary edging curtain assembly installed.
Figure 5:
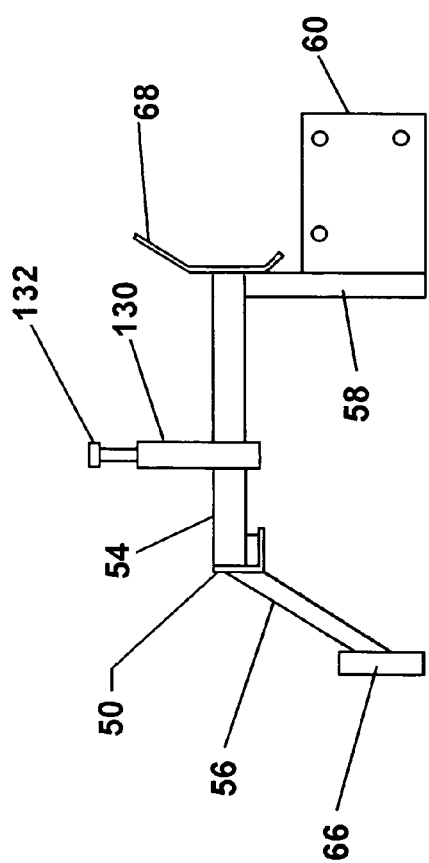
FIG. 5 is a side view of the sprayer frame.

Referring additionally to FIGS. 3, 4 and 5, the sprayer assembly 14 includes a rectangular base frame 48 having a front rail 50 and a rear rail 52 interconnected by side rails 54. A pair of laterally spaced, forwardly and downwardly inclined front wheel supports 56 and pivotal wheels 57 are attached at the front rail 50. A pair of downwardly extend, laterally spaced support arms 58 are attached at the rear rail 52. A rearwardly extending mounting plate 60 is attached each support arm 58. The mounting plates 60 are attached to the front sides of the chassis 30 by fasteners 62. The support arms 58 are laterally reinforced by triangular plates 63.

Each wheel support 56 includes a support leg 64 welded at the rear upper end to the front rail 50 of the base frame 48. A cylindrical support sleeve 66 is vertically attached to the front end of the support leg 64. The wheels 57 include vertical pivot shafts journaled in the sleeves 66 whereby the wheels 57 are free to rotate in alignment with the drive path of the sprayer. A heat shield 68 is attached at the rear rail 52 of the base frame 48 opposite the muffler 40 to shield the tank 16 from engine exhaust heat.

Referring to FIGS. 1 and 2, the tank 16 is generally cylindrical and extends transversely on the base frame 48. The tank 16 includes bottom support legs 67 connected to a pair of laterally spaced longitudinally extending support rails 69 attached to the front and rear rails of the base frame 48. The tank 16 is preferably a commercially available 25-gallon plastic lawn and garden tank. The tank 16 includes a fill cap 70 at the top and a drain port 72 at the bottom on one side.

Figure 7:
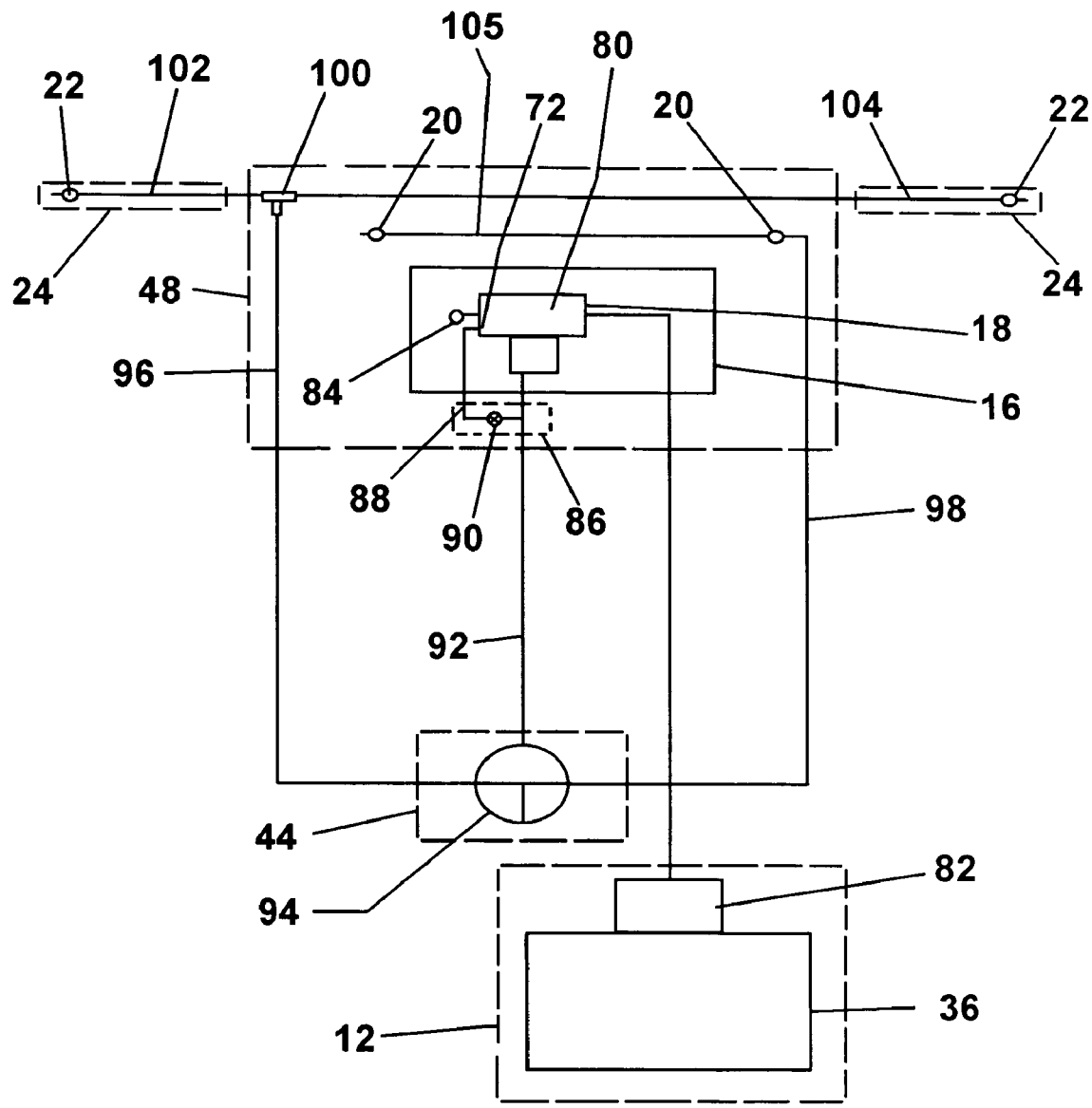
FIG. 7 is a schematic diagram of the liquid dispensing system.

Referring to the schematic of FIG. 7, the liquid dispensing system 18 is mounted on the top of the tank 16 adjacent the fill cap 70. The system 18 includes an electric pump 80 electrically connected with the alternator 82 of the engine 36. The intake of the pump 80 is connected with an inlet line 84 extending downwardly into the tank and terminating with an inlet adjacent the bottom thereof. The pump 80 includes an outlet connected with an outlet manifold 86. A by pass line 88 is connected between the drain port 72 and the manifold 86. A flow control assembly 90, pressure gage, regulator and by pass valve, are provided on the manifold 86 for indicating and establishing the fluid operating pressure. A supply line 92 is fluidly connected between the manifold 86, upstream of the valve 90, and a control valve 94 mounted on the handle 18 of the drive unit 12. The control valve 94 is preferably a three way ball valve. The valve 94 includes a sprayer arm outlet line 96 and frame outlet line 98. The arm outlet line 94 is connected to tee 100 having a branch line 102 mounted on one of the pivotal boom arms and terminating with a spray nozzle 22, and a branch line 104 connected to the other pivotal boom arm and terminating with a spray nozzle 22. The frame outlet line 98 has a capped end and has a distribution line 105 transversely extending across a frame member 106. The line 105 includes the nozzles 20 and 20, which are located adjacent the sides of the frame within the forward lateral view of the sprayer operator.

The control valve 94 has a closed position blocking the supply line 92, a first open position connecting with the frame outlet line 98 and a second open position connecting with both the arm outlet line 96 and the frame outlet line 98. Accordingly, upon starting the engine 36 with the valve 94 in the closed position, the pump 80 is powered by the alternator 82 and fluid from the tank 16 is recirculated through lines 84,88 past the assembly 90. In the first open position, fluid is pumped through the lines 92, 98 and dispersed by the frame nozzles. In the second open position, fluid is pumped through the lines 92, 96, 98 and dispersed by both the frame nozzles 20 and the boom nozzles 22.

Referring to FIGS. 1 through 4, the arms 24 are biaxially pivotally attached at the outer ends of a lateral frame member to the side rails of the frame 24. Each arm 24 is pivotally connected by a horizontal hinge 120 for movement between a horizontal position and a raised position about a horizontal axis 122. Each arm is pivotally connected for pivotal movement about a vertical axis 124 by a break away hinge assembly 126, which allows the arm to deflect is an obstacle is encountered and return under spring biasing to a normal extended position thereafter. Each arm 24 is the raised position is cradled in an outwardly opening U-shaped bracket 130 mounted on a support post 132 attached to the side of the frame 48. The arms 24 are maintained in the lowered horizontal position by a tie member 134, such as a chain 122. The arms 24 are maintained at a raised position on the bracket 130 by removable pin 136.

Figure 6:
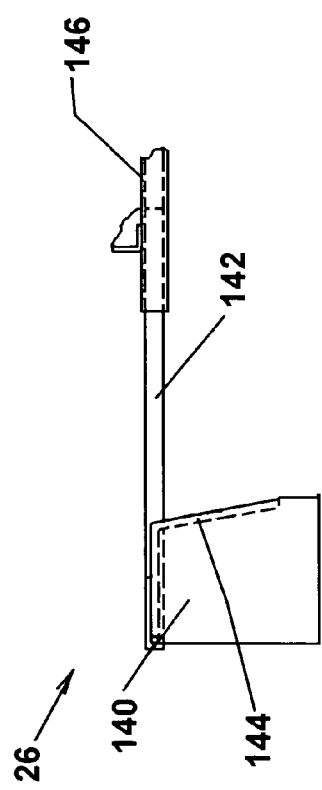
FIG. 6 is a side view of the edging curtain assembly.

Referring to FIGS. 2, 4 and 6, the sprayer 10 is provided with an edging curtain assembly 26 for prescribing clear delineation between application areas or differing growth zones. The curtain assembly 26 includes a vertical edging curtain 140 supported on a mounting arm 142 extending outwardly from one side of the frame. The arm 142 includes a wire hanger rod 144 at the outer end thereof. The arm 142 is telescopically selectively insertable within a complementary rectangular support sleeve 146 extending outwardly from the frame 48 rearwardly of the arms 24. The mounting arm 136 is releasably secured on the sleeve 138 by cross pin 148. The rod 144 includes a horizontal longitudinally extending section centrally attached to the outer end of the arm 142, and inwardly inclined horizontal sections downwardly terminating with inclined end sections. The edging curtain 140 is a generally rectangular member formed of a flexible or rigid material having upper and lateral connections with the rod sections. Preferably, the curtain 140 is a waterproof canvas material having marginal edges attached to the rod 144 by snap connections.

In operation, with the edging curtain in position, the sprayer is operated with the arms 24 raised and the valve 134 conditioned for distributing the liquid through the frame nozzles 20. The outermost spray is downwardly directed by the edging curtain and accurately outwardly terminated at the lower drip edge of the curtain thereby providing a clearly delineated spray boundary.

It will be appreciated that the present invention fulfills the above objectives by providing a high productivity, highly maneuverable sprayer that allows the operator to accurately disperse liquid additives to discrete turf areas. Where extremely accurate edging is required to prevent unwanted species migration, the edging curtain may be deployed and the operator may accurately guide the spray pattern along irregular borders. The low center of gravity of the sprayer frame and tank provide stability over irregular contours. The folding arm assemblies permit wide swath extended arm spraying and narrow swath raised arm spraying for controlled spraying in narrow paths.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claim.

What is claimed is:

1. A walk behind sprayer for applying maintenance liquids within the border of a turf growing area comprising: a walk behind zero turn radius drive unit having an engine operatively connected to a pair of laterally spaced manually steerable drive wheels; a rear operator control handle assembly for selectively controlling rotation of said drive wheels; a generally rectangular metal frame connected at a rear end to the front end of said drive unit and having a pair of laterally spaced wheel assemblies including pivotal wheels connected at the front end thereof; sprayer arms mounted on opposite sides of said frame and extending outwardly therefrom, said arms moveable between a horizontal spray position and a vertical stowed position; a transversely disposed fluid tank mounted on the top of said frame; an electric pump mounted on said tank and having an inlet in said tank for removing liquid from said tank, said pump having an outlet fluidly connected with an inlet on valve means carried on said control handle; a first fluid conduit having an inlet connected with a first outlet on said valve means and a distal end extending transversely across said frame; a first plurality of fluid dispensing nozzles on said distal end of said first fluid conduit; a second fluid conduit having an inlet fluidly connected with a second outlet on said valve means and having branch conduits extending to said spray arms; fluid dispensing nozzles on said branch conduits, said valve means being manually operative to block flow to said fluid conduits in a first position and to selectively deliver fluid to said conduits in secondary positions; and a vertically extending spray barrier transversely attached to a side of said frame adjacent one of said sprayer arms in said stowed position, said spray barrier effective to block outward spray of liquid from an adjacent nozzle on said first conduit for direction downwardly at defined drip edges thereby preventing unwanted application of the liquid beyond the border.

2. A spraying apparatus for applying liquid media to turf areas comprising: a drive unit including an engine operatively connected to a pair of laterally spaced manually steerable drive wheels for providing guided movement to the sprayer; frame means connected to said drive unit and projecting forwardly thereof and having forwardly extending pivoting wheel assemblies; a fluid reservoir for liquid media carried by said frame means; pump means for delivering the liquid media from said fluid reservoir to liquid delivery lines, nozzle means fluidly connected with said liquid delivery lines and transversely carried on said frame means for dispensing the liquid media; control means for said liquid delivery lines carried by said drive unit, said control means being manually operative to selectively deliver the liquid media to said nozzle means, said nozzle means including a first set of laterally spaced nozzles carried on said frame means with the outermost being within the forward lateral vision of the operator; and a vertically and transversely disposed liquid barrier removably carried on one side of said frame means and operative to block outward spray of liquid media from an adjacent nozzle for direction downwardly at a defined drip edges thereby preventing application of the liquid media beyond a defined border in the turf area.

3. The sprayer apparatus as recited in claim 2 wherein said liquid barrier is a flexible sheet material.

4. A spraying apparatus for applying liquid media to turf areas comprising: a drive unit including an engine operatively connected to a pair of laterally spaced manually steerable drive wheels for providing guided movement to the sprayer; frame means connected to said drive unit and projecting forwardly thereof and having forwardly extending pivoting wheel assemblies; a fluid reservoir for liquid media carried by said frame means; pump means for delivering the liquid media from said fluid reservoir to liquid delivery lines, nozzle means fluidly connected with said liquid delivery lines and transversely carried on said frame means for dispensing the liquid media, and control means for said liquid delivery lines carried by said drive unit, said control means being manually operative to selectively deliver the liquid media to said nozzle means, said nozzle means including a first set of laterally spaced nozzles carried on said frame means with the outermost being within the forward lateral vision of the operator.

5. The spraying apparatus as recited in claim 4 wherein said liquid dispensing means includes a pair of lateral spray arms extending laterally outwardly from the sides of said frame means and including a second set of nozzles thereon.

6. The spraying apparatus as recited in claim 5 wherein said control means are operative to selectively fluidly connect said sets of nozzles to said pump means.

7. The spraying apparatus as recited in claim 6 wherein said spray arms are pivotally connected to said frame means for movement about a horizontal longitudinal axis between a horizontal position and a vertical position.

8. The spraying apparatus as recited in claim 7 wherein said spray arms are pivotally connected to said frame means by breakaway hinge means for spring biased movement about a vertical axis upon contact with obstacles in the turf areas.

9. The spraying apparatus as recited in claim 8 including support means carried at the sides of said frame means for releasably maintaining said spray arms in said vertical position.

10. The spraying apparatus as recited in claim 7 wherein said control means is operative for blocking flow of liquid media to said nozzle means in a first condition, allowing flow of liquid media to said first set of nozzles in a second condition, and allowing flow of liquid media to said first set and said second set of nozzles in a third condition.

11. The spraying apparatus as recited in claim 10 wherein a recirculation path is established between said pump means and said reservoir means in said first condition.

12. The spraying apparatus as recited in claim 11 wherein said drive unit is a walk behind zero turn radius assembly having a rearwardly extending operator control handle assembly and said control means are operator accessible on said handle assembly permitting selection of said control means conditions during travel of the apparatus.

13. The sprayer apparatus as recited in claim 4 wherein said tank means is a cylindrical reservoir extending transversely on said frame means.

* * * * *